United States Patent [19]

Seaton

[11] Patent Number: 5,018,151
[45] Date of Patent: May 21, 1991

[54] LASER CONTROL APPARATUS AND METHOD FOR FREQUENCY OFFSET PHASE LOCKING AND THE MINIMIZING OF RETRO-REFLECTION EFFECTS

[76] Inventor: Norman T. Seaton, 2821 9th St., Berkeley, Calif. 94710

[21] Appl. No.: 645,803

[22] Filed: Aug. 28, 1984

Related U.S. Application Data

[63] Continuation-in-part of Ser. No. 268,399, May 29, 1981, Pat. No. 4,468,773.

[51] Int. Cl.[5] .............................................. H01S 3/098
[52] U.S. Cl. ...................................................... 372/18
[58] Field of Search ............................... 372/18, 29, 32

[56] References Cited

U.S. PATENT DOCUMENTS

| | | | |
|---|---|---|---|
| 3,437,955 | 4/1969 | Enloe et al. | 250/199 |
| 4,272,734 | 6/1981 | Jarrett et al. | 372/32 |
| 4,405,230 | 9/1983 | Tew et al. | 372/32 |
| 4,434,490 | 2/1984 | Kevaya et al. | 372/32 |

Primary Examiner—Akm Ullah
Assistant Examiner—Robert E. Wise
Attorney, Agent, or Firm—Glen R. Grunewald

[57] ABSTRACT

An active laser is slaved in an offset frequency relationship to an ultrastable reference laser, by a comparator with a substantially infinite capture range in order to preclude phase-locking on a harmonic or mirror image of the desired offset frequency. The frequency of such a slaved laser is then virtually immune to retro-reflection of its own light back into its resonant cavity, and gains a frequency stability equal to that of the reference. Further, the reference laser is preferably stabilized against retro-reflection of its own light by a method involving selective displacement of objects in the path of the reference laser beam, detection of a Doppler-shifted retro-reflected radiation, and insertion of appropriate optical controls in the beam path to eliminate such retro-reflected radiation from impinging on the reference laser cavity. Multiple laser systems are disclosed in which the active lasers are both series referenced and parallel referenced to a reference laser.

8 Claims, 2 Drawing Sheets

LASER CONTROL APPARATUS AND METHOD FOR FREQUENCY OFFSET PHASE LOCKING AND THE MINIMIZING OF RETRO-REFLECTION EFFECTS

RELATED APPLICATION

This Application is a continuation-in-part of my prior application Ser. No. 268,399 for "LASER CONTROL APPARATUS AND METHOD" filed May 29, 1981, now U.S. Pat. No. 4,468,773.

BACKGROUND OF THE INVENTION

The invention relates to lasers and is particularly directed to a feedback control system for, firstly, general offset frequency locking of a slave laser to a reference laser by phase locking the beat frequency between the lasers to an offset reference frequency and, secondly, stabilizing the light frequency of a laser subject to retro-reflection through the use of a frequency offset locking technique.

The parent application showed apparatus and a method for establishing a highly stable single-frequency laser output by phase locking the beat frequency signal in a transverse Zeeman laser to the output of a crystal-controlled frequency synthesizer. It also described art relevant to that apparatus and method. The problem of retro-reflection was pointed out and an illustration given of a method for identifying sources of such retro-reflection so that appropriate precautions could be taken for its reduction. The effects of retro-reflection on frequency stability are quite significant having been observed by many investigators [e.g. W.R.C. Rowley, I.E.E.E. Tras. Instrum. and Meas. I.M. 15, 146 (1966)]. It shows up in Lamb-dip stabilized lasers [A. L. Bloom and D. L. Wright, Appl. Opt. 5, 1528 (1966)]and even in iodine stabilized lasers [K. Tanaka and T. Kurosawa, Japanese J. Appl. Phys. 15, 2271 (1976)].

A well-known technique for reducing retro-reflection from a specular source is to use a polarizer and a quarter waveplate with its axis set at 45° so that the retro-reflected light which traverses the waveplate twice undergoes a half wave retardation at 45° and is therefore in effect rotated by 90° and subsequently blocked by the polarizer. Reductions of retro-reflection of the order of $10^{-5}$ to $10^{-6}$ are obtainable this way with a V-coated waveplate. The residual effect stems largely from a zig-zag double internal reflection in the quarter waveplate which contributes a component with additional half wave retardation such that this component is not rejected by the polarizer, no matter what its extinction ratio. Faraday rotators can be used, but they are expensive and provide much less attenuation. They are, however, effective in suppression of back scattered light, unlike the polarizer and quarter waveplate combination. Yet, in some situations—for example, retro-reflection occurring in fibre optic applications---retro-reflection is difficult or almost impossible to handle adequately because phase fluctuations cannot effectively be canceled by the aforementioned techniques. There is, nonetheless, one technique that can be used to provide an extraordinary degree of frequency stability in the face of substantial retro-reflection. From a survey of the literature it seems not to have been applied previously, perhaps because of the apparently insurmountable complexity and high cost involved The technique is based on the slaving, to a reference by the method of offset frequency locking as herein described, the laser subjected to retro-reflection. The requirements of this technique are made particularly simple and cost effective by the disclosures of the parent invention.

L. H. Enloe et al [U.S. Pat. No. 3,437,955 (1969)]purport to disclose a technique for locking the phase of one laser with another (i.e. a zero frequency offset homodyne system), but the practical difficulties in operating such a system are formidable: there is first the problem of setting up the right conditions for lock acquisition, in view of the fact that the loop tracking range the Enloe et al. system is only 1 part in 5000 of the normal laser frequency excursions, and unless the beat frequency is observed with an oscilloscope or frequency counter, the correct condition is not found easily by manual control. Secondly, there is the problem of the intrinsic phase jitter of the 6328 neon line in particular, even under the most favorable conditions [investigated by A. E. Siegman et al, I.E.E.E. J. Quantum Electron. QE-3, 180 (1967)]. This second problem, combined with that of establishing a resonant frequency in the piezo transducer [see P. W. Smith, I.E.E.E. J. Quantum Electron. QE-1, 343 (1965)]sufficiently high to keep the loop phase shift below the critical 90° limit over the jitter frequency range, makes true phase locking particularly difficult. Enloe et al suggest in a concluding paragraph that their techniques can further be used to achieve the offset frequency locking of two lasers by disposing a second phase detector between the photodetector and transducer so that the beat frequency generated in the former can be compared with a reference difference (off-set) frequency. In that case, however, the foregoing problems are compounded by two additional ones stemming from the then-known types of phase detectors: mirror image locking, and harmonic locking. These problems make possible a multiplicity of lock frequencies above and below the reference laser frequency. In Enloe et al, neither the recognition of these problems nor their solution is offered.

A frequency offset locking technique for two lasers was first practiced by J. L. Hall [I.E.E.E. J. Quantum Electron. QE-4, 638 (1968)], who used a frequency-to-voltage converter and analog servo loop to establish the frequency offset. In such a system there is no problem of locking on harmonics of the reference offset frequency and locking at an image frequency of the desired offset frequency is not possible, for if the active or "slave" laser is set to operate above the reference by the offset amount, it cannot lock with this offset below the reference laser because that condition does not lead to a stable servo loop. In Hall's system, long term frequency stability of the offset laser depends on the accuracy of the frequency-to-voltage conversion. While this can be made very high through the use of a frequency counter and digital-to-analogue converter [see H. Gerhardt and A. Timmerman, Opt. Comm. 21, 343 (1977)], improved performance still could be expected from phase locking the beat frequency between the two lasers to the desired offset frequency. This technique has been used by Hall [see J. L. Hall in Fundamental and Applied Laser Physics, Proceedings, 1971 Esfahan Symposium, M.S. Feld, A. Javan, and N. A. Kurnit, Eds. (Wiley, New York, 1973), p. 463]and others [J. Helmcke, S. A. Lee, and J. L. Hall, Appl. Opt. 21, 1686 (1982)], but the precise details of their phase locking circuitry were not disclosed there and have evidently not been published.

Currently, D. A. Lewis and R. M. Evans (Iowa State University at Ames, Iowa) have published in Jan. 1985, in the 'Review of Scientific Instruments' an article entitled 'Laser Frequency Offset Synthesizer' dealing with their phase locking method for generating a laser frequency offset by a given amount from a reference laser frequency. The method of Lewis and Evans is clearly and substantially different from the compact method outlined in the final paragraph of my parent application. Likewise, there is inferential evidence that the invention of the parent application has not been employed in the work of Hall and others.

SUMMARY OF THE INVENTION

An object of the present invention is to provide a laser control system for establishing a very high degree of laser frequency stability in the presence of retro-reflection, coupled with an ability to prevent spurious locking of a laser output to a harmonic or mirror image of a desired offset frequency in a comparatively inexpensive and compact system. The basic system utilizes two lasers: one an ultrastable "reference" laser, the other—termed the "active" laser—which may be, for example, operatively associated with a utilization device, such as a fiber optic communication system. In the present laser control system, the phase properties of an inter-laser beat frequency are used to control the "active" laser operating frequency in a phase-locked, offset frequency relationship. The invention achieves this object by means sensing changes in phase of a beat frequency signal (which is proportional to the inter-laser beat frequency) relative to a reference electrical offset frequency signal, the phase change sensing means including a comparator having a substantially infinite capture range and generating an electric signal as a function of such change. The generated signal is applied to one or more transducers which control respective parameters of the active laser to thus stabilize the fundamental operating radiation frequency of the active laser.

A still further object of the invention is to provide an easily discernible means to evaluate the presence of retro-reflection and to locate the sources thereof in a simple and inexpensive manner so as to permit proper isolation of such retro-reflection from the reference laser in order to optimize its frequency stability.

The invention possesses other objects and features, some of which will be set forth in the following description of the preferred form of the invention which is illustrated in the drawings accompanying and forming part of this specification. It is to be understood, however, that variations in the showing made by the drawings and description may be adopted within the scope of the invention as set forth in the claims.

DETAILED DESCRIPTION OF PREFERRED EMBODIMENTS

Figure 1:
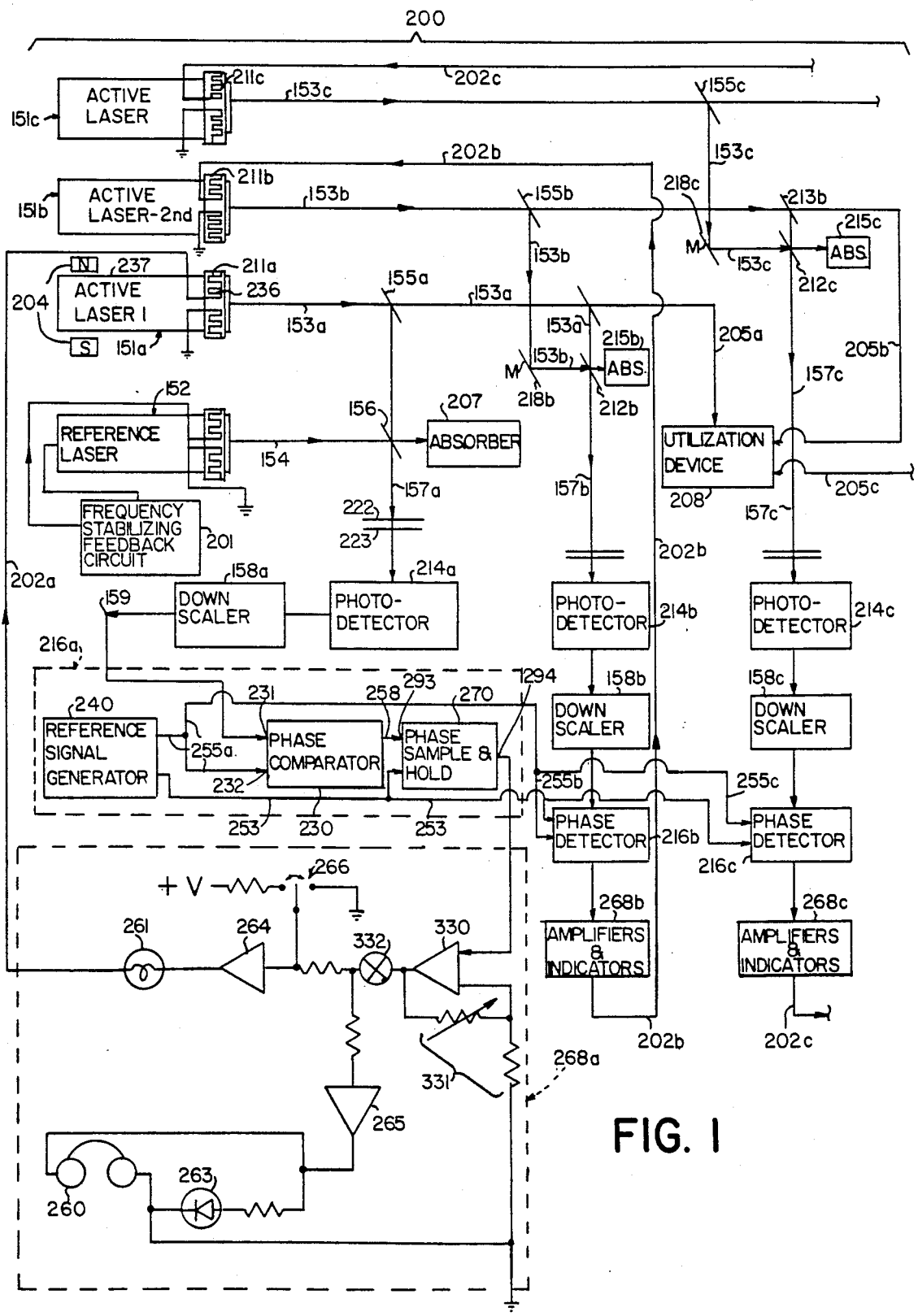
FIG. 1 is a schematic diagram of a control system for lasers constructed in accordance with the present invention and coupled in series for offset phase locking to a reference laser.

The method and apparatus of the present invention are adapted for use with a laser system having output radiation including an intermodal beat frequency and for use with means responsive to an electric signal for controlling the light frequency of the laser.

Examples of lasers with which the present control system may be practiced are as follows. Some laser tubes, operating in a transverse magnetic field of a magnitude such that the Zeeman splitting is approximately equal to the difference in frequency of adjacent cavity modes, will generate two orthogonally polarized radiation modes having an intermodal frequency difference on the order of several hundred kiloHerz. Other laser tubes having appropriate length and operating in zero magnetic field will exhibit three or more radiation modes. Adjacent modes will combine in pairs to produce beat frequencies, which in turn will mix to yield a third, lower beat frequency that provides the intermodal beat frequency utilized in the present invention. These examples are only for purposes of illustration and are not intended to limit the scope of the invention or the nature of the lasers with which it may be practiced.

In addition, the details of construction and operation of the basic control apparatus for slaving by offset frequency locking an active laser to a reference laser is set forth in my parent application, now U.S. Pat. No. 4,468,773. It is the purpose of the following description to further elucidate the details of offset frequency locking of an active or slave laser to a reference laser by means of the basic control circuitry given in the parent application. Since most of the basic circuit functions illustrated in FIG. 1 are identical to those shown in FIG. 1 of the parent application, I have included in parenthesis corresponding elements in the parent application.

A multiple laser system, designated generally by 200 in FIG. 1, has a series of an "active" lasers 151a, 151b, 151c and a "reference" laser 152, as they will be termed hereinafter. System 200 will be described initially in terms of a two laser system in which an active laser 151a and reference laser 152 or "slave" laser is set to operate above the reference by the are employed. The mixed—i.e., "heterodyned"—output radiation thereof includes an inter-laser beat frequency. According to the present invention, that inter-laser beat frequency is applied to a downscaler and electronic circuitry similar to that disclosed in FIG. 1 of my parent application for producing an electric signal cooperating with means 211 for controlling the light frequency of the active output beam 153a of laser 151a. The circuitry employs elements which render system 200 insensitive to harmonic and mirror image frequencies of the chosen offset frequency.

Before beginning description of system 200, it is desirable to mention that only the primary or straight through beam 153 from "active" laser 151a is used in obtaining the desired output signal, here illustrated as applied to transmission by fibre optic lines 205a to a utilization device 208. Active laser 151a may be a transverse Zeeman laser of the same type as that used for laser 10 of FIG. 1 of my parent application, or a laser polarized by a large transverse magnetic field, or a short laser such that a single frequency is present with or without a polarizer.

In FIG. 1, it is seen that the output radiation of active laser 151a is represented by the line 153a, as mentioned earlier, and the output radiation for reference laser 152 is represented by the line 154. When the present invention is practiced with transverse Zeeman lasers, output beams 153, 154 will each ordinarily include two orthogonally polarized components with slightly different frequencies. To obtain the desired single-frequency output, one of the two components may be removed by a linear polarizer. As may be seen in FIG. 1, active laser 151a may be of the integral end mirror type without Brewster plates and include means generating a strong magnetic field exemplified by north and south magnetic poles 204 (about 700 gauss as compared to 350 gauss for laser 10 in FIG. 1 of my parent application) the strength and orientation of poles 204 being such that single frequency lasing is obtained for a near-line-center a mode whose polarization axis is parallel to the magnetic field. This mode is then phase locked at the desired offset frequency from the reference beam. Where the offset frequency must be varied over the range of many hundreds of megahertz, a single-frequency output beam also can be obtained with a short laser tube of the same type by incorporation of Brewster-angle plates or windows, but only at some sacrifice in output beam power. Such magnetic field polarization can be used for offsets up to one GHz if the isotope mixture in the lasing gas is appropriately chosen.

The light output 153a of laser 151a is mixed with light output 154 of laser 152 by means of beam splitters 155a, 156 and the combined light output 157a containing the resultant beat frequency is directed onto photodetective means 214a. Reference laser 152 is preferably provided with a total absorber 207 downbeam from splitter 156 to absorb the portion of the beam not being used. Preferably, the output of photodetector means 214a is applied to a down-scaler 158a. Down-scaler 158a is needed for two reasons, first of all because the desired interlaser beat frequency is generally in the megahertz range, which is too high for use with the preferred electronic circuitry, where signal frequencies of 100-500 kilohertz are desirable. Thus, for example, if the light frequency of beam 153a is 100 megahertz above that of beam 154 then the inter-laser beat frequency will be 100 megahertz and the division by down-scaler 158a will need to be a factor of at least 200, in order to attain a comparison frequency of 500 kilohertz or less. Down scaler 158a also serves the function of digitizing the inter-laser beat frequency in order to permit its comparison with an electrical reference frequency signal, in much the same manner previously described in my parent application with respect to digitizer 26.

The electric signal appearing at the output 159 of down-scaler 158a, which is proportional to the light beat frequency and is referred to as the "active frequency signal," is applied to phase detector means indicated generally at 216a, for sensing changes in phase of the active frequency signal, relative to the reference frequency signal. The phase detector means 216a provides a second electric signal varying as a function of the phase changes, and being adapted for connection to electric signal responsive means 211a controlling the light frequency of the output beam 153a of active laser 151a. Phase detector means 216a (substantially identical to phase detector 16 of my parent application) preferably comprises a phase comparator means 230 connected at input 231 to output line 159 of down-scaler 158a for receiving the beat frequency related electric signal and connected at input 232 to the output 255a of a reference electric signal generator 240. Signal generator 240 may be identical in structure to signal generator 40 of my parent application. However, if a separate frequency generator is to be used, it also should develop a frequency-proportional voltage 253 required as an input of the sample and hold circuit 270. All of the means 214a, 158a, 216a and 268a are connected for purposes of phase locking the active electric signal 159 of frequency $f_a$ to the offset reference electric signal 253 of frequency $f_r$.

In the arrangement of FIG. 1, active laser 151a may be substantially identical to laser 10 in my parent application except that—laser 151a being herein (as regards to beam 153a) a slave unit strictly controlled by reference laser 152. Direct optical feedback, as shown by 12 of the parent application, with respect to laser 10 is supplanted by the scaled down interlaser optical beat signal 159a. Active laser 151a will operate so that its light frequency is offset from that of reference laser 152 by an amount equal to the down-scaling factor times the reference frequency electric signal $f_r$ supplied by generator 240 to phase detector 216a. Whether the generated active frequency light signal 153a is above or below that of the reference light signal 154 depends on the position of a phase reversal switch 332, a double pole, double throw switch identical to switch 132 in the parent application. (Equivalent operation also can be obtained by phase reversal at the inputs of comparator 30 in the parent application by switch 135.)

Turning next to the "reference" laser 152, this laser is preferably an ultrastable unit of the transverse Zeeman type described and claimed in the parent application. Such a transverse Zeeman laser would be identical in structure to the laser 10 of the parent application, and the control circuit 201 is substantially identical to the circuit of FIG. 1 in my parent application (although the selectivity afforded by inclusion of switches 45-48 in the reference signal generator 40 in the parent application may be dispensed with where unnecessary, and will be s considered for simplicity for FIG. 1 of this application. Because of the general similarity, accordingly, description of the essential elements of laser 152 and its control circuits will not be repeated herein.

The desired phase comparison (explained in greater detail previously with respect to phase comparator 30 of the parent application) is achieved by phase comparator 230. It is likewise an "infinite" capture range comparator, sometimes called a phase-frequency comparator, available from a number of manufacturers as an integrated circuit identified as 4046 and based on U.S. Pat. No. 3,714,463 awarded to J. M. DeLaune. (Another type of such a phase-frequency detector is described by S. D. Malaviya in U.S. Pat. No. 3,870,900). Such an "infinite" capture range phase detector is necessary to avoid a multiplicity of lock points otherwise possible when the active signal 159 is in a harmonic relation with the reference signal 253. The output states of such edge-controlled digital memory phase detectors are controlled by the phase difference of the positive going edges of the input signals. Under standard operation in a phase locked loop, the input signals will have zero phase difference and the tri-state output will be in its high impedance condition. As explained in the parent application, unavoidable coupling of internal signals in such an integrated circuit at zero phase leads to a zero-phase dead zone in the output, and this in turn leads in a phase locked loop to a "zero-phase hunting noise" of a magnitude that is intolerable in the present work. T avoid this type of phase noise when using such a phase comparator, the desired phase lock is affected with the leading edges of the active and reference signals at inputs 231 (31) and 232 (32) having a phase difference considerably exceeding the zero-phase dead zone limits. The phase difference is preferably less than 180° to avoid potential loop instability problems, and 90° seems near optimum for offset frequency locking applications.

Figure 2:
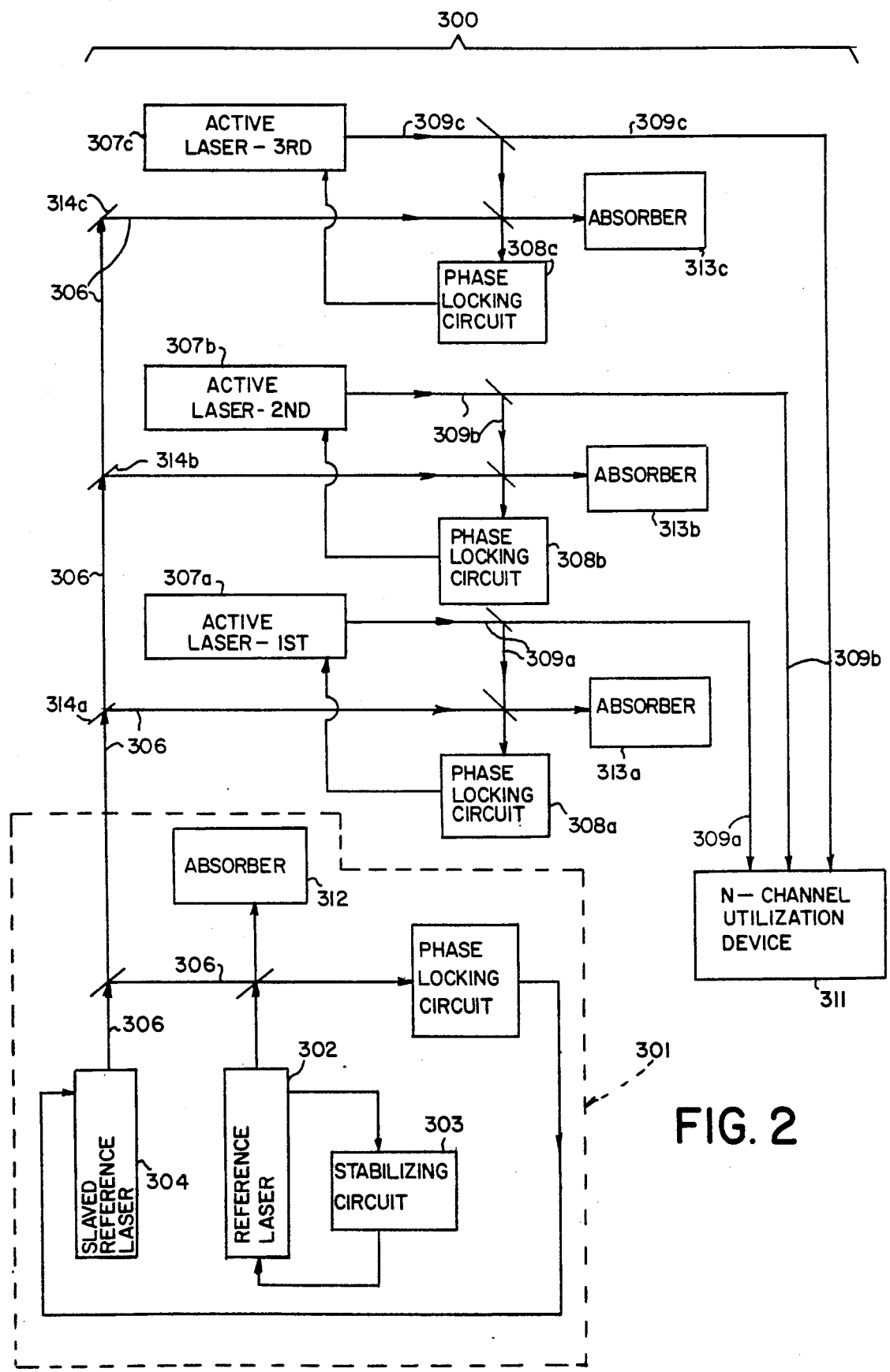
FIG. 2 is a schematic diagram of a control system for lasers in which the lasers are coupled in parallel to a slaved reference laser.

The preferred phase-frequency comparators typically have an output stage with p and n driver circuits (as represented schematically in FIG. 2 of the parent application). Depending on the sign of the frequency difference $f_r-f_a$, one or other of the circuits (but not both) will be energized for a duration depending on the phase difference between the two input signals to comparator means 230 (30). For all active signal frequencies $f_a$ less than the reference signal frequency $f_r$, the output signal on line 258 (58) from phase comparator will be a digital signal at logic 0 state by virtue of a pull-down resistor. If the signal frequency $f_a$ is greater than the reference frequency $f_r$, the output signal is raised to a logic 1 state, but only for a duration proportional to the phase difference between the input signals. The output signal from phase comparator 230 (30) is a positive going digital signal having a duty cycle dependent on and representative of the phase difference between the two signals applied as inputs thereto.

The digital signal output on line 258 (58) from phase comparator 230 (30) serves as an intermediate signal that is fed to a sample-and-hold circuit 270 (70). The sample-and-hold circuit inverts the pulse train and generates a voltage proportional to the width of a positive pulse, and holds that voltage until it can be updated with the voltage generated by the succeeding pulse. Thus such a phase sample-and-hold circuit will generate a smooth signal 294 accurately and almost instantaneously representing any phase changes in the inter-laser (or intermodal) beat frequency. As shown in FIG. 1, this signal 294 is then fed through several stages of amplification to drive the light frequency control means 211a (11). (Extensive and complete details on the phase sample-and-hold circuitry are given in the parent application).

For the desired fast responsive correction to the frequency excursions of the light frequency of laser 151a at economical cost, means 211a (11) controlling the light frequency of beam 153a is again preferably provided by the direct electrothermal transducer disclosed in my U.S. Pat. No. 4,293,223. It may be noted here that because of the limited tensile strength of the glass or quartz used as the material forming the cavity of a typical laser tube, it is preferable to mount transducers of this type such that they place wall 237 (37) under compression at normal room temperatures, and a relatively neutral stress at operating temperature.

With reference to FIG. 1, it will be recognized by those skilled in the art that before this system can provide virtually turn-key operation from a cold start-up, some form of temperature regulation is required to keep the transducer within its operating range, and that a timer initiated by turn-on of power should be used to determine when, after warm-up, active stabilization should start. For instance, a warm-up period of 25 to 35 minutes is required to attain an ambient temperature of 40° C. in tubes 151, 152. Secondly, as in all such systems, the usefulness of a manual servo override switch is obvious and it is essential in the case of a momentary power failure disrupting the temperature/timing cycle. As shown in FIG. 1, such a servo override switch is easily implemented with a center-off toggle switch 266 used to drive amplifier 264 full on or completely off. Visual evidence of the transducer status i.e., whether it is near the middle of its operating range is available in terms of the intensity of indicator lamp 261. Switch 266 by overriding all other signals is essential in setting up this desirable condition, especially in the offset locked lasers.

In the frequency offset locking scheme depicted in FIG. 1 for reference laser 152 and active laser 151a, a portion of each output beam 154 and 153a is split off by beam splitters 156 and 155a and very carefully aligned to give coplanar wavefronts for the generation of heterodyning beam 157a which passes through polarizer 222 and quarter waveplate 223 to photodetctor 214a, with the balance of the light energy totally absorbed by absorber 207. Providing there is no retro-reflection or back-scattering from either the absorber or the photodetector and polarizer waveplate combination, there will be no mixing of the reference beam into the final working beam 153a of the active laser 151a. The frequency stability attained by the slave laser in such an offset locking scheme is limited almost solely by the stability of the reference laser, and great care should be taken therefore to see that retro-reflection of the reference beam back into its cavity is reduced to the absolute minimum. Because the servo system of the slave laser 151a tries to follow frequency fluctuations in the reference laser 152, the control indicators of the slave, headphones 260 and lamp 263, can be used in conjunction with slight manual movement of 222, 223, and 214a to indicate the presence of retro-reflection affecting the stability of the reference laser 152. On the other hand, a 1% power retro-reflection into the slave laser will typically produce at most a 100 kHz change in its frequency, and in the low audio range to d.c.. this will be further reduced by the servo loop system. Except to aid in minimizing severe retro-reflection back into a slave laser the indicator headphones and lamps of the slave laser servo systems are used primarily for initial set-up, as described below.

In the operation of a frequency offset locking scheme as depicted in FIG. 1, there will normally appear two additional problems to those discussed previously. These arise from the failure of the photodetector and/or downscaler (divider) to operate properly at very high frequencies (i.e. 100–1000 Mhz), such as those encountered at the very start of stabilization. This failure takes two forms: a complete absence of signal, and the threshold condition where the known counter divider implementing down-scaler 158a misses a fraction of the counts and can therefore produce a false servo lock at a higher actual laser offset frequency than that expected. With the system of the parent application and the circuitry of FIG. 2 of the application, absence of a signal presents no problem because, as explained in the parent application, lack of a signal at 'a' of FIG. 2 always results in the output of the sample and hold circuit 270 (70) being driven to its maximum output. Depending on the polarity of phase reversal switch 332 (132), transducer 236 (36) is either driven full on or completely off so that the system will be driven to acquire lock as rapidly as possible. On the other hand, if there is acquisition of the above-mentioned false-lock, evidence of that is clearly established by presence of an abnormal amount of noise in headphones 260. To lock on the true, properly scaled down offset frequency, the above-mentioned servo override switch 266 is switched from the center position (shown in FIG. 1) to one side or the other to drive transducer 236 in the same direction as before the lock (as determined by the status of indicator lamp 261) until a beat signal is heard in headphones 260, whereupon the switch 266 is returned to normal and the correct lock is acquired, as evidenced by white noise in the headphones.

Thus, even in systems where a small frequency offset is desired in order to enable use of standard photodiodes and TTL low power scaler logic (with attendant economies), the correct offset frequency is easily attained, and there is no problem from harmonic locking or mirror image locking. An intentional mirror image lock can only be obtained with the phase reversal switch 132 (or 135, if used). Optimum offset frequency stability is obtained with a minimum down scaling factor of about 32–64 so that normal laser phase jitter does not drive phase comparator 230 outside its linear response window of 0° to 180°.

The technology described in accordance with the parent invention has thus a wider area of application than just the frequency stabilization of a single laser. A frequency offset slave laser affording almost turn-key operation requires only that a scaled-down photodetector output be used as one input 231 to phase comparator 230 with the other input 232 supplied by the internal (or an external) frequency synthesizer 240 (or 40). The attainable precision of the frequency offset is really quite remarkable. Fluctuations in a 10 MHz offset are usually no more than a few cycles over a period of 1 second, and even that error can be accounted for by the frequency counting statistics. The frequency stability of reference laser 152 is thus transferred virtually unaltered (for all practical purposes) to the offset slave laser 151a no matter what its offset frequency, and even in the presence of retro-reflecting objects in the path of light beam 153a.

Though the system shown in the embodiment of the parent application utilizes two Zeeman-type lasers, it will be recognized by those skilled in the art that the system is applicable to provide a controlling signal to a continuous wave dye-laser, or other laser, it being obvious that an appropriate transducer must be available for control of the output light frequency according to the type of laser chosen to correspond to laser 151a. (Such transducer could be driven, for example, by the output signal from driver 265, easily available at headphone 260.)

FIG. 1 illustrates a multiple laser system 200 in which the lasers are successively offset phase locked in series to reference laser 152, i.e., "series referenced." Thus, reference laser 152 is used to control slave or active lasers 151a, 151b and 151c by heterodyning the output 153a of first active laser 151a with reference laser 152, heterodyning the output 153b of second active laser 151b with output 153a of first active laser 151a, and heterodyning output 153c of the third active laser 151c with output 153b of the second active laser to produce mixed intermodal beat frequency beams 157a, 157b and 157c.

Heterodyning a portion of output beams 153a with 153b can be accomplished without intermixing the operating output beams by employing beam splitter 155b, which directs a portion of the output to mirror 218b. The beam is in turn directed to beam splitter 212b, which is down-beam from beam splitter 213a, so that the heterodyning takes place after a portion of the output beam 153a is split by beam splitter 213a. Absorber 215b is provided to prevent retro-reflection back into splitter 212b. Heterodyning of output beam 153b with beam 153c is accomplished in a similar manner with the elements being identified by corresponding reference numerals.

Each of mixed beams 157a, 157b, 157c are received by associated photodetectors 214a, 214b, 214c, and the second and third active lasers are provided with downscalers 158b, 158c, phase detectors 216b, 261c, amplifiers and indicators 268b, 268c, and feedback lines 202b, 202c to laser transducers 211b, 211c. The output beams of the second active laser may be thereby offset phase locked to the output of the first active laser, and the third offset phase locked to the second, with beams 153a, 153b, 153c passing beyond beam splitters 155a, 155b, 155c to transmission lines 205a, 205b, 205c to N-channel utilization device 208.

A single reference signal generator 240 can be used with all phase comparator circuits, as indicated by input lines 255a, 255b and 255c, with the particular offset frequencies determined by the corresponding downscalers.

An advantage of the series referenced laser system 200, especially where a large number of lasers are to be offset frequency locked, is that the "reference" beam frequency can be built up progressively with relatively slow detectors and downscalers, since they never have to handle more than the adjacent channel frequency differences.

While system 200 illustrates 3 series referenced offset phase locked lasers, it will be apparent that many more lasers, n lasers, can be coupled for offset phase locking to reference laser 152.

FIG. 2 illustrates an offset phase locked laser system 300 which is parallel referenced to a reference laser assembly, generally designated 301. In order to further minimize the possibility of retro-reflection destabilizing laser system 300, reference laser assembly 301 is provided by a reference laser 302 with associated frequency stabilizing feedback circuit 303 constructed as described in detail in my parent application. Slaved to reference laser 303 is a laser 304, shown in the drawing as "slaved reference laser" because the output beam 306 is used as a reference beam to which active lasers 307a, 307b and 307c are slaved in offset frequency locked relation.

Coupled to each of the active lasers is a phase locking circuit 308a, 308b, 308c, constructed as described in detail in connection with FIG. 1, and the stabilized output beams 309a, 309b, 309c are fed to one or more utilization devices 311. In order to minimize the opportunity for retro-reflection system 300 further preferably includes beam absorbers 312, 313a, 313b, 313c, with beam absorber 312 being the most critical to the system. A disadvantage of parallel referenced multi-laser system 300 as compared series referenced system 200 is that the amplitude of slaved reference laser beam 306 diminishes with each of beam splitters 314a, 314b, 314c, but for many applications the number of active lasers, n, is not so large as to pose a serious problem.

As also will be appreciated, systems can be devised which include combinations of series referenced and parallel referenced offset phase locked lasers.

While the invention has been described in terms of specific embodiments, it is clear that those skilled in the art will readily see modifications falling within the spirit of the invention. Hence, it is intended that the invention not be limited to the exact description, the claims being intended to include all such modifications falling within their scope.

What is claimed is:

1. A laser control apparatus including an active laser, a reference laser, means for phase locking the radiation output of said active laser to the radiation output of said reference laser with a relative frequency offset, wherein the improvement in said laser control apparatus comprises:

said means for phase locking including means for heterodyning the radiation outputs of said lasers to produce a light beat frequency, means for generating an active frequency electric signal as a function of said light beat frequency, means for generating a reference offset frequency electric signal, and a phase comparator means having electric circuitry means for sensing changes in phase between two electric signals and coupled to said means for generating said active frequency electric signal and said means for generating said reference offset frequency electric signal, the phase comparator electric circuitry means providing an output electric signal as a result of changes in phase between said active frequency electric signal and said reference offset frequency electric signal, said phase comparator electric circuitry means including means for providing a substantially infinite capture to thereby prevent phase locking of said active frequency electric signal to said reference offset frequency electric signal at harmonic and mirror image frequencies of said reference offset frequency electric signal.

2. The laser control apparatus of claim 1 wherein,
said means for generating an active frequency electric signal generates a digital signal;
said means for generating a reference offset frequency electric signal generates a digital signal;
said phase comparator electric circuitry means is formed for receipt of digital input signals, said phase comparator electric circuitry means generates a digital output signal in response to the presence of an edge of said active frequency electric signal and in the presence of an edge of said reference offset frequency electric signal; and
said means for phase locking locks said apparatus with said edge of said active frequency electric signal and said edge of said reference offset frequency electric signal having a phase difference exceeding the zero phase hunting noise limits of said apparatus.

3. The laser control apparatus of claim 2 wherein,
said phase comparator means generates a digital output signal having a duty cycle controlled by a time difference between an edge of said active frequency electric signal and an edge said reference offset frequency electric signal; and
phase sample-and-hold means connected to the output of said phase comparator means and producing therefrom an output signal that is a function of said duty cycle, said phase sample-and-hold means further updating said output signal of said sample-and-hold means upon each successive output digital pulse from said phase comparator means.

4. The laser control apparatus of claim 3 wherein,
said means for phase locking includes means for converting any phase modulation of an input signal to said phase comparator means into an amplitude modulated electric signal; and
a user discernible indicator means connected to receive and responsive to said amplitude modulated electric signal.

5. A laser control apparatus as defined in claim 1 wherein,
said active laser is a transverse Zeeman laser 6. A laser control apparatus as defined in claim 1 wherein,
said apparatus includes a plurality of active lasers series referenced to said reference laser with a first of said active lasers being provided with means for offset frequency phase locking to said reference laser, and means for offset frequency phase locking coupled between each successive active laser and one of said reference laser and a previous offset frequency phase locked active laser.

7. A laser control apparatus as defined in claim 1 wherein,
said apparatus includes a plurality of active lasers parallel referenced to said reference laser with each of said active lasers having means for phase locking to said reference laser.

8. A method of obtaining an ultrastable light frequency output from an active laser of two-laser system having an ultrastable reference laser controlling the frequency of the light output of the active laser comprising the steps of:

heterodyning the light output of the active laser and the reference laser to produce a coherent light beam having a light beat frequency proportional to the difference between the frequency of said light output of the active laser and the frequency of the light output of the reference laser;
generating an active frequency electric signal as a function of the light beat frequency;
generating a reference offset frequency electric signal;
comparing changes in phase between the reference offset frequency electric signal and the active frequency electric signal by a phase comparator having a substantially infinite capture range; and
controlling the active laser radiation output in response to changes in phase sensed during said comparing step by phase locking the active frequency electric signal to the reference offset frequency electric signal.

* * * * *

UNITED STATES PATENT AND TRADEMARK OFFICE
CERTIFICATE OF CORRECTION

PATENT NO. : 5,018,151
DATED : May 21, 1991
INVENTOR(S) : NORMAN T. SEATON

It is certified that error appears in the above-identified patent and that said Letters Patent is hereby corrected as shown below:

Column 4, lines 36-37, cancel "or 'slave' laser is set to operate above the reference by the".

Column 6, line 32, "s" should be --so--.

Column 6, line 60, "T" should be --To--.

Column 11, line 22, after "capture" insert --range--.

Signed and Sealed this

Twenty-ninth Day of September, 1992

Attest:

DOUGLAS B. COMER

Attesting Officer     Acting Commissioner of Patents and Trademarks